United States Patent [19]
Brodsky

[11] Patent Number: 5,177,833
[45] Date of Patent: Jan. 12, 1993

[54] COMPUTER CARTRIDGE CLEANING SYSTEM

[76] Inventor: Martin E. Brodsky, 15 Fletcher Dr., Morganville, N.J. 07751

[21] Appl. No.: 803,596

[22] Filed: Dec. 9, 1991

[51] Int. Cl.⁵ .................................................. B08B 5/04
[52] U.S. Cl. .......................................... 15/310; 15/346
[58] Field of Search ................. 15/310, 311, 345, 346, 15/302, 303

[56] References Cited

U.S. PATENT DOCUMENTS

| | | | |
|---|---|---|---|
| 3,479,222 | 11/1969 | David et al. | 15/302 X |
| 3,765,051 | 10/1973 | Wanat | 15/310 X |
| 4,213,223 | 7/1980 | Cosby | 15/311 X |
| 4,403,369 | 9/1983 | Lin | 15/311 X |
| 4,416,702 | 11/1983 | Jackman | 15/311 X |
| 4,801,334 | 1/1989 | Wada et al. | 15/303 X |

*Primary Examiner*—Chris K. Moore
*Attorney, Agent, or Firm*—Charles I. Brodsky

[57] ABSTRACT

Cartridges used in removable hard drive computer systems can become contaminated by ambient dust over periods of use. The invention describes an enclosure which accepts the cartridge, opens its shutter to expose the platter surface, and provides a stream of directed air to clear any dust particles present. The apparatus also includes a manually operated winder to rotate the area of the platter exposed to the air stream at any given instant of time. The specific components employed are arranged so that any contaminants dislodged fall by gravity to assist in their dispersal.

14 Claims, 6 Drawing Sheets

COMPUTER CARTRIDGE CLEANING SYSTEM

FIELD OF THE INVENTION

This invention relates to removable, hard drive computer systems, in general, and to cleaning apparatus for such removable hard drive cartridges, in particular.

BACKGROUND OF THE INVENTION

As is well known and understood, removable, hard drive computer systems employ a single drive housing with its own read-right heads, to accept numerous removable cartridges—each containing its own new disk—, thereby saving money through the reuse of the mechanical aspects of a hard drive. As is also well known and understood, two types of hard drive systems are available—one, in which the platter and heads are sealed in an airtight chassis, and the other, in which the cartridges have a shutter which must open inside the drive to admit the read-right heads. As has been determined, this second version has been found to allow dust to enter the cartridge during periods of normal use, and has been noted to produce bad sectors on the platter, to create read and write errors, and even to result in head crashes.

As will additionally be appreciated by those skilled in the art, computer data is a very time consuming and costly thing to lose. If the cartridge were to become contaminated, it is obvious that data will be lost, and thousands of dollars can easily be spent in lost data and/or man-hours required to reenter that data which was in fact lost. Clearly, if contamination were found to be at a high enough level, the cartridge itself could very easily have to be replaced—and, in a worst-case scenario, a resultant head crash could cause the hard drive itself to be damaged. This is especially so as operators continue to use the cartridge over-and-over again, even where it is intended to back up cartridges in an attempt to make the system secure.

OBJECTS OF THE INVENTION

It is, therefore, an object of the invention to provide a cleaning system for these removable, hard drive cartridges, so as to maintain them at a high level of integrity over repeated use.

It is another object of the invention to utilize such a cleaning system in extending the life of the cartridge and of the hard drive employed.

It is also an object of the invention to provide such a cleaning system able to remove enough of any contaminant so as to allow recovery of almost all the information encrypted.

It is a further object of the invention to provide such a cleaning system as would offer a high level of security of the data, and to extend the time between which contamination of a significant nature might tend to develop.

SUMMARY OF THE INVENTION

As will become clear hereinafter, the cartridge cleaning apparatus of the present invention incorporates an enclosure, into which a disk cartridge is inserted, shutter first. Once the cartridge is fully inserted—into an enclosure that is just slightly larger than the cartridge itself—, a door is secured, creating a sealed environment for the apparatus. At the end of the enclosure, a slider is controlled to open the shutter on the cartridge and to turn on an included filtering system. As will be seen, the disk platter of the invention then becomes exposed to a fan system, which comprises a high pressure blower and an intake to remove floating contaminants present in the enclosure and dislodged from the platter. On either side of the fan employed, a removable filter will be seen to be included, to keep contaminants from re-entering the cartridge, and to keep dust from accumulating in the fan system. At the time of filtering, an included winder is turned, so as to rotate the disk in continuing to expose other areas of the platter to the air flow, and by way of locking the winder into the center hub at the underside of the platter in turning the disk.

As will be seen from the preferred embodiment of the invention described, a manually operable slider is utilized to both open the shutter on the disk cartridge and to electrically energize the fan system into operation. Battery power actuates the fan assembly, in this embodiment, such that with a manually operable winder, the cartridge cleaning apparatus can easily be carried about and stored. To facilitate the operation and the attainment of the objectives desired, a track-arrangement is employed to guide the disk cartridge into position to be acted upon, and a closure door is provided, sealed so that once the cartridge is inserted for cleaning, the inside of the enclosure would be protected from external contaminants during the time that the fan system is operating.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
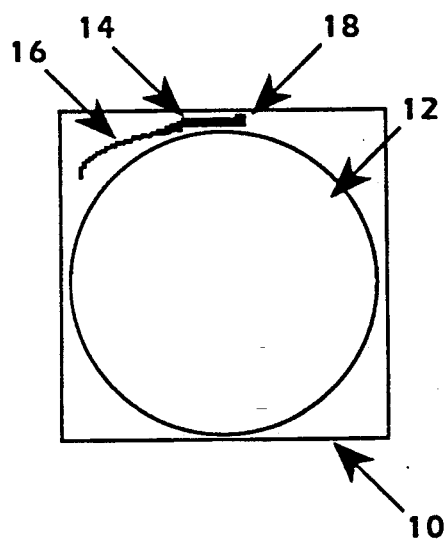
FIG. 1 illustrates a megabyte disk cartridge of a type which is intended to be cleaned according to the teachings of the present invention.

In FIG. 1, a 44 and 88 megabyte disk cartridge 10 of the type manufactured by SYQUEST TECHNOLOGY of Mountainview, Calif. is shown. The plastic cartridge 10 encompasses a disk platter 12 carrying the various computer data, which is exposed to the read-write apparatus by a shutter 14 slidable along a track 16. A handle 18 on the shutter 14, in typical operation, is contacted when the cartridge is installed in the computer system, to open the shutter 14 so as to expose the platter 12.

Figure 2:
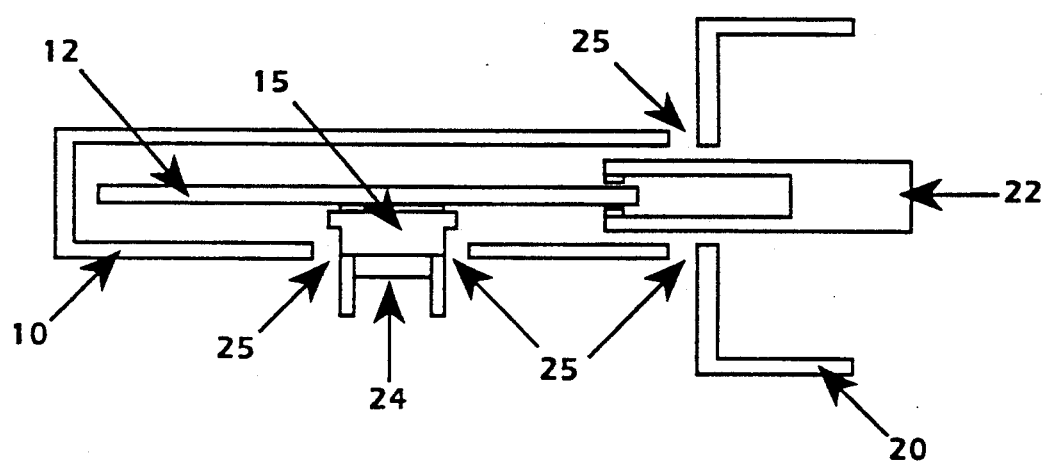
FIG. 2 schematically illustrates the situation which exists in hard drive cartridge systems giving rise to the need for the invention.

In FIG. 2, the hard drive assembly is illustrated by the reference numeral 20, with the read-write apparatus shown at 22. A spindle, or hub, 15 is located at the underside of the platter 12, at its center, to be coupled to a motor 24 which rotates the platter 12 during operation. As will be readily appreciated by those skilled in the art, even when inserted into the hard drive, air and dust can enter the cartridge at the points shown by the "arrows" 25, and can become contaminants in the cartridge 10 to ultimately cause bad sectors to develop, read and write errors to result—and, in the ultimate, head crashes. As will be appreciated, the dependability in such arrangements will fall short of that available with fixed drives, where the platter and read-write heads are sealed in an airtight chassis.

Figure 3:
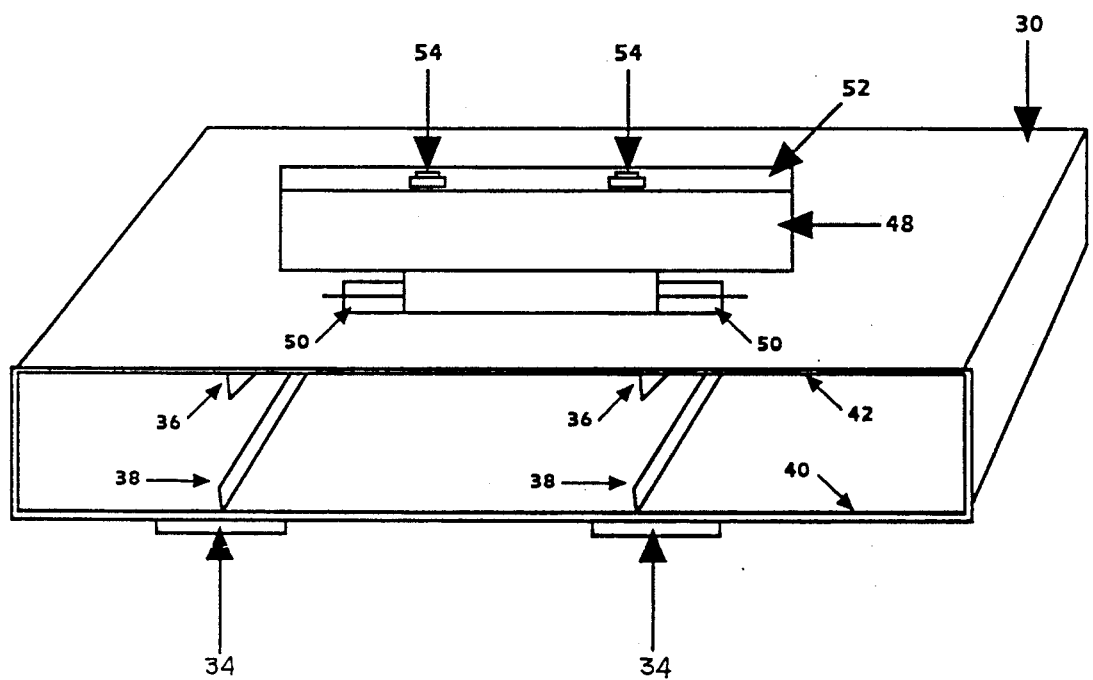
FIGS. 3-5 illustrate portions of the cartridge cleaning apparatus helpful in an understanding of the invention.
Figure 4:
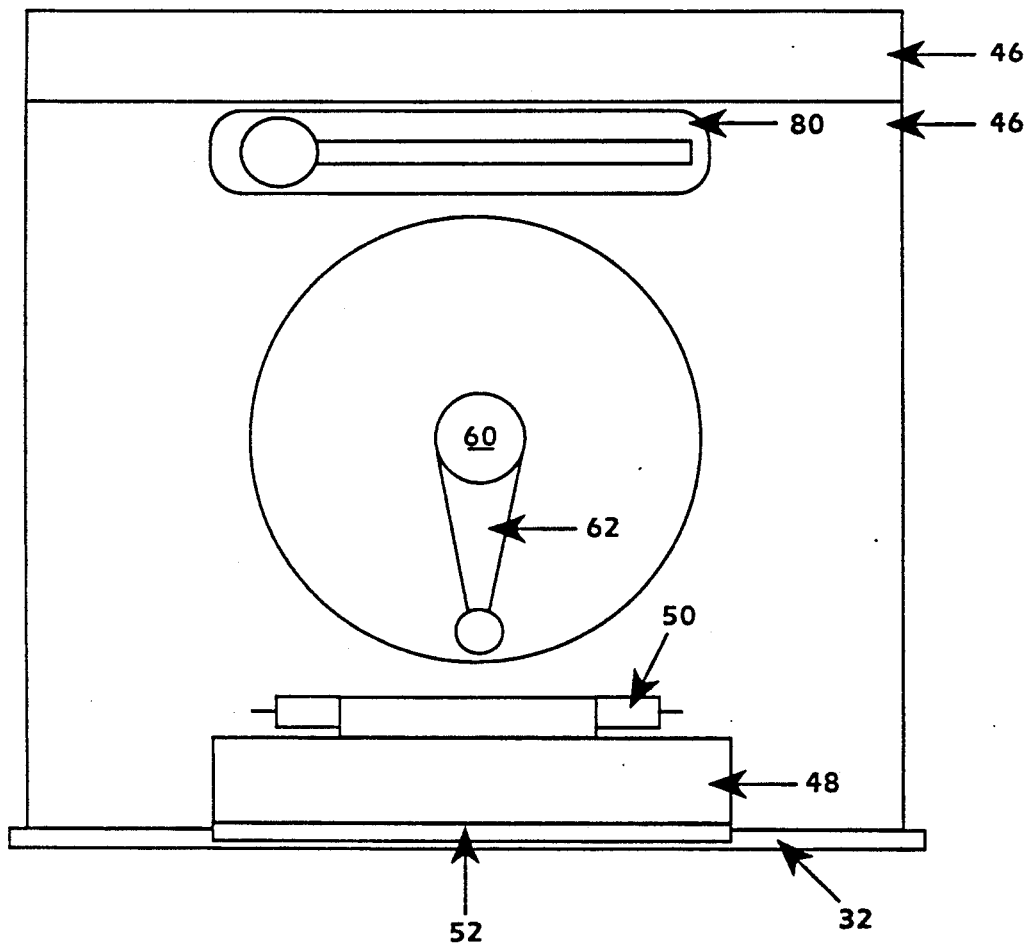

In FIGS. 3 and 4, reference numeral 30 identifies the box enclosure for the cartridge closing apparatus of the invention, having a door 32 rotatable about a pair of hinges 34 for controlling insertion of the cartridge 10 into, and removal from, the enclosure 30. A pair of upper and lower tracks 36, 38, accept the cartridge 10, to guide it inwardly of the enclosure 30, suspending the cartridge 30 just slightly above the base 40 and just slightly below the cover 42. At the same time, the guides 36, 38 cooperate in limiting the insertion of the cartridge 10 to fall just short of a point in the enclosure box 30, indicated by the reference numeral 44, and behind which the filtering system of the invention (FIG. 5) is situated, as at 46. A latch 48 is shown secured to the cover 42, rotatable about the hinges 50, having an end plate 52 with a pair of pressure clips 54 at its underside. As more particularly shown in FIG. 4, the latch 48 is arranged to seat atop the enclosure door 32 when closed, with the pressure clips 54 serving to bear against the door 32 in holding the door 32 closed during the time that the disk platter is to be cleaned. A winder 60 is shown as having a handle 62, which couples through the cover 42 of the enclosure 30, positioned so as to co-align with the hub 15 at the center of the cartridge 10, in connection therewith. Manual rotation of the handle 62 from outside the enclosure 30 will thus be seen to rotate the platter 12 within the cartridge 10, once the shutter 14 (FIG. 1) is open. In a preferred embodiment of the invention, the enclosure 30 is composed of plastic, as is the latch 48. The plate 52, on the other hand, may be comprised as an aluminum plate.

Understanding that FIG. 3 illustrates the enclosure 30 as if the door 32 were not present, operation of the apparatus of the invention entails insertion of the cartridge 10 with its hub 15 pointing upwardly, along the tracks 36, 38 until the cartridge is fully inserted. The door 32 is then closed upwardly about the hinges 34 to take the position shown in FIG. 4, and the latch 48 is then rotated downwardly about the hinges 50 so that the plate 52 then exerts a pressure closure upon the door 32 in keeping the enclosure sealed. To facilitate this further, the inside of the door 32 may be provided with an O-ring surrounding seal so as to prevent external contaminants from entering the enclosure 30 once the door 32 is closed.

Figure 5:
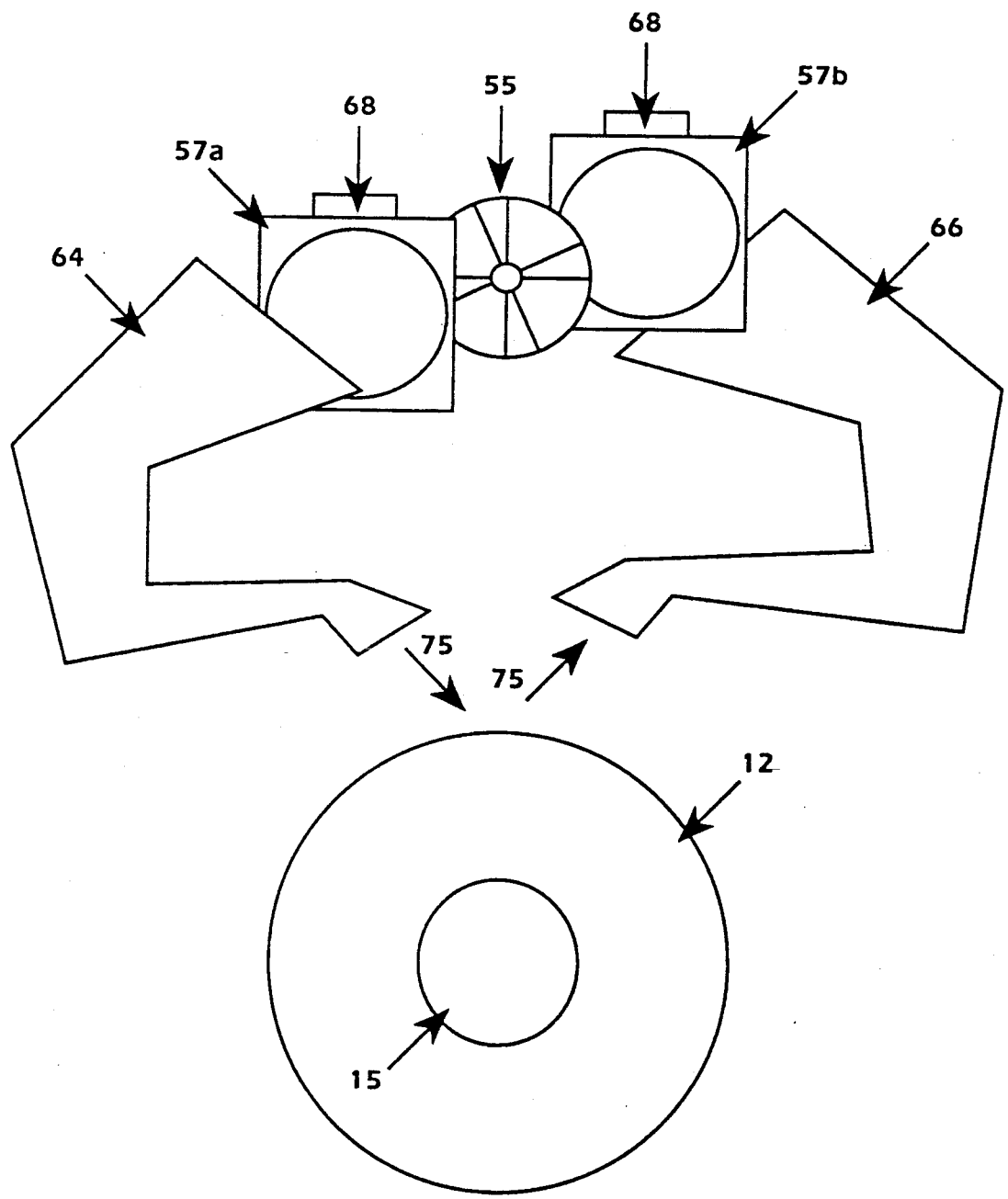

FIG. 5 schematically illustrates the filtering system 46 within the enclosure 30, rearwardly of the defining point 44. As illustrated, the filtering system 46 includes a high power fan 55, a pair of filters 57 (understood to be removable from the enclosure 30 through a pair of slot openings (not shown), and two sets of tubings 64, 66. The disk platter 12 is also shown, along with its central hub 15. Understanding that the air flow produced by the fan 55 traverses in a counterclockwise direction (as indicated by the arrows 75), it will be appreciated that the air flow from the fan 55 passes through the filter 57a, through the tubing 64 to develop a high pressure air blow directed upon the platter 12 to dislodge any contaminants resting upon the platter or embedded in its surface. Any contaminants dislodged by such pressure flow is then sucked up by the air intake tubing 66, to be passed through the second filter 57b in completing its path. In accordance with the invention, any medium—e.g. cloth—could be used for the filters 57, and any appropriate fan 55, can be employed. The loops 68 just define a convenient manner of grasping the filter to remove it from the enclosure for later cleaning or replacement, if desired. As will be appreciated by those skilled in the art, a type of O-ring or other surrounding seal is to define the slot (not shown) through which the filters 57 are removed, so as to limit any air or contaminants from entering into the enclosure during such time as the enclosure is in storage, awaiting future use.

Figure 6A:
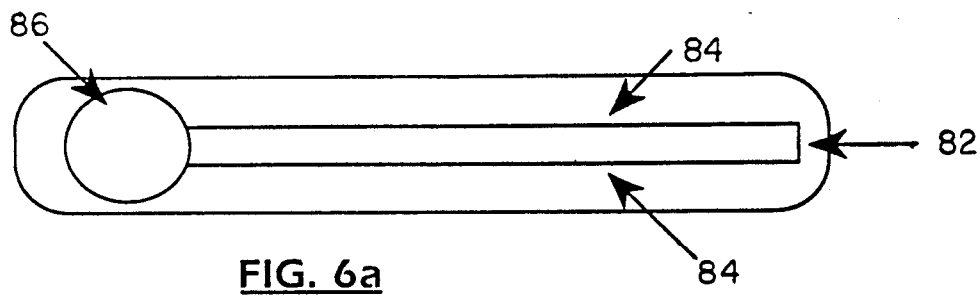
FIGS. 6a-6d are helpful in an understanding of the slider which opens the disk shutter and actuates the filtration system in directing the required air flow to dislodge contaminants present upon, or embedded into, the disk platter.

FIG. 4 additionally shows an area 80 in which a manually operated slider is enclosed. FIG. 6a is a top view of the slider movable within a slot 82 lined with opposing brush surfaces 84 to likewise limit any external contaminants from entering into the enclosure 30. The slider area 80 may be indented, where desired, and provided with a thumb rest 86 which connects with a metallic coupler 88 on its underside.

Figure 6B:
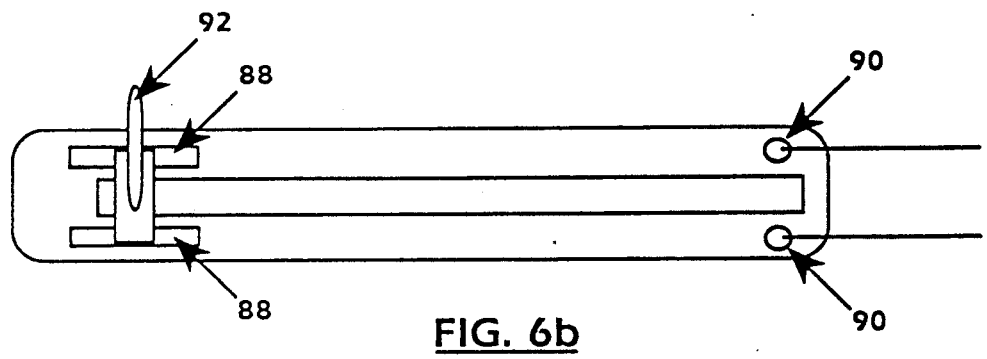
Figure 6C:
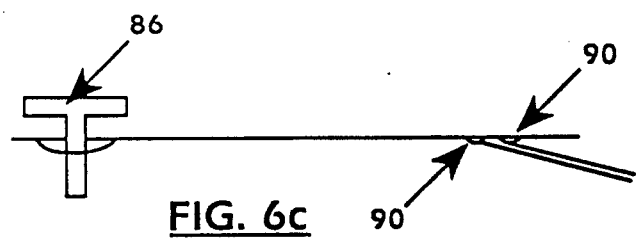

As shown in the bottom view of FIG. 6b of the slider arrangement 80, a pair of normally-open electrical contacts 90 couple with the power source for the filtering system, and with the fan 55. Where a battery power source—or other electrical source—is employed, moving the thumb rest 86 to the right in the drawing along the slot 82 thus eventually brings the metallic coupler 88 in connection with the contacts 90 so as to complete the electrical circuit and start the fan 55 and filtering system operating. While that is ongoing, with the resultant directed air flow from the fan 55, going through the filter 57a, the high pressure blower tubing 64, directed at the platter 12 and then through the air intake tubing 66 to exit by the filter 57b, the operator of the cartridge cleaning apparatus can then rotate the winder handle 62 so as to bring all the areas of the disk platter into proper position for the filter air flow while the filtering is ongoing. Analysis has shown that a gradual winding of the handle 62 for approximately 60 seconds or so should be sufficient to enable the directed air flow from the high power fan 55 to dislodge any platter surface contaminants that may be present. As will be appreciated, best performance of the cartridge cleaning apparatus can be had when the enclosure 30 is oriented so that the handle 62 can be rotated in a plane which allows the dislodged contaminants from the platter to fall by gravity in easing their dispersal. Analysis has indicated that the preferred arrangement is one where the directed air from the high pressure blowing tubing 64 is upwardly directed toward the platter 12, so that the dislodged contaminants can fall and then be sucked out. FIG. 6c shows a side view of the slider apparatus as thus far described.

Figure 6D:
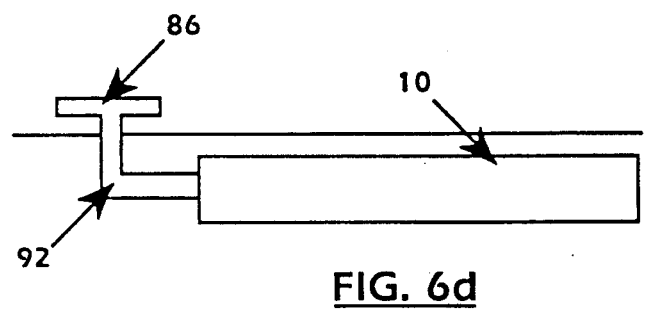

As was also previously mentioned, the apparatus serves to open the shutter 14 of the disk cartridge so as to expose the platter 12 to the directed air flow. This is effected by means of an extension arm 92 secured at the underside of the thumb rest configuration 86 (FIG. 6d) such that as the thumb rest 86 is moved to connect the contacts 90, that same sliding action serves to bear against the handle 18 of the cartridge (FIG. 1), to correspondingly open the shutter 14. The thumb rest 86 and extension arm 92 are more clearly shown in FIG. 6d, with the extension arm 92 extending inwardly of the cartridge 10 so as to bear against the handle 18 in its opening. Thus, as the thumb rest 86 is moved across, it will both move the shutter 14 to its open position so as to provide access to the platter, and so as to eventually connect the contacts 90 in actuating the filtering system. To such end, it will obviously be understood that the coupler 88 incorporates a metal fabrication so as to allow for the electrical circuit connection to be obtained.

While there has been described what is considered to be a preferred embodiment of the present invention, it will be readily appreciated by those skilled in the art that modifications can be made without departing from the scope of the teachings herein of progressively opening the cartridge shutter to expose more and more of the platter surface and to continually rotate the platter surface so that more and more of the exposed area becomes acted upon by the filtering air flow in clearing the platter of contaminants. For at least such reason, therefore, resort should be had to the claims appended hereto for a true understanding of the scope of the invention.

I claim:

1. Cartridge cleaning apparatus for a removable hard drive system, comprising:
    an enclosure for receiving a disk cartridge having a shutter openable to expose a platter surface which is rotatable through a hub located at an underside thereof;
    a fan within said enclosure;
    first means coupled with said enclosure to open said cartridge shutter and thereby expose at least a portion of said platter surface;
    second means coupled with said enclosure to energize said fan to direct a flow of air towards said exposed portion of platter surface;
    and third means coupled with said enclosure and with said hub to rotate different portions of said platter surface to said directed flow of air.

2. The cartridge cleaning apparatus of claim 1 wherein there is additionally included a first filter within said enclosure for capturing any dust contaminants dislodged from said platter surface under the force of said directed air flow.

3. The cartridge cleaning apparatus of claim 2 wherein said first filter is removable from said enclosure for subsequent cleaning.

4. The cartridge cleaning apparatus of claim 2 wherein there is further included a second filter within said enclosure for capturing any dust initially present in said enclosure prior to the energization of said fan and any dust contaminants dislodged from said platter surface not captured by said first filter.

5. The cartridge cleaning apparatus of claim 4 wherein said second filter is removable from said enclosure for subsequent cleaning.

6. The cartridge cleaning apparatus of claim 1 wherein said enclosure includes track means for guiding said disk cartridge into position to be acted upon in opening its shutter and in exposing its platter surface to the flow directed by said fan.

7. The cartridge cleaning apparatus of claim 6 wherein said third means includes a winder coupled through said enclosure to connect with said cartridge in rotating said platter surface.

8. The cartridge cleaning apparatus of claim 7 wherein said winder is manually operable.

9. The cartridge cleaning apparatus of claim 7 wherein said first means includes a slider coupled through said enclosure to movably connect with said cartridge in opening said shutter to expose said platter surface.

10. The cartridge cleaning apparatus of claim 9 wherein said slider is manually operable.

11. The cartridge cleaning apparatus of claim 7 wherein said second means includes a pair of normally-open electrical switch contacts to energize said fan upon the closure thereof.

12. The cartridge cleaning apparatus of claim 11 wherein said first means includes a slider coupled through said enclosure to movably connect with said cartridge in opening said shutter to expose said platter surface and to further movably connect to close said electrical switch contacts to energize said fan.

13. The cartridge cleaning apparatus of claim 1 wherein said enclosure includes a door openable to permit insertion and removal of said cartridge and having a surrounding seal to prevent external contaminants from entering into said enclosure when said door is closed.

14. The cartridge cleaning apparatus of claim 13 wherein said enclosure further includes a plate operable to exert a pressure on said enclosure door to maintain said door closed during operation of said fan.

* * * * *